(12) United States Patent
Watkins, Jr.

(10) Patent No.: US 6,227,104 B1
(45) Date of Patent: May 8, 2001

(54) DRAINING DEVICE FOR CANNED GOODS

(76) Inventor: Tedrowe Watkins, Jr., 16016 30th Dr. SE., Mill Creek, WA (US) 98012

( * ) Notice: Subject to any disclaimer, the term of this patent is extended or adjusted under 35 U.S.C. 154(b) by 0 days.

(21) Appl. No.: 09/315,967

(22) Filed: May 21, 1999

Related U.S. Application Data

(60) Provisional application No. 60/119,991, filed on Feb. 12, 1999.

(51) Int. Cl.⁷ ........................................................ B30B 9/02
(52) U.S. Cl. ............................................ 100/110; 100/234
(58) Field of Search ................................... 100/110, 234, 100/243, 917; D7/666

(56) References Cited

U.S. PATENT DOCUMENTS

| | | |
|---|---|---|
| D. 330,313 | 10/1992 | Green . |
| D. 337,702 | 7/1993 | Lange . |
| D. 342,649 | 12/1993 | Miller et al. . |
| D. 343,995 * | 2/1994 | Djelmane ............................ D7/666 |
| D. 358,304 | 5/1995 | Hoddinott . |
| D. 366,189 | 1/1996 | Bidlack . |
| D. 379,139 | 5/1997 | Berde . |
| 1,996,970 * | 4/1935 | Morris ................................ 100/234 |
| 3,995,544 | 12/1976 | Farley . |
| 5,272,969 | 12/1993 | McDonald . |
| 5,295,432 | 3/1994 | Keville et al. . |
| 5,363,759 | 11/1994 | D'Ambrosio . |

FOREIGN PATENT DOCUMENTS 256344   8/1926   (GB) .

* cited by examiner

Primary Examiner—Stephen F. Gerrity
(74) Attorney, Agent, or Firm—Richard C. Litman

(57) ABSTRACT

A draining device adapted for draining liquids from canned goods and for removing severed lids from canned goods includes an upper handle assembly, a lower handle assembly, a food-press member, a pin for attaching the food-press member to the upper handle, and a pin for pivotally attaching adjacent respective distal ends of assemblies to permit the upper handle of the upper handle assembly and the lower handle of the lower handle assembly to be moved toward and away from each other between a closed position and an opened position. The upper handle assembly has the upper handle. The lower handle assembly has the lower handle and a truncated, circular can-support member. The food-press member, which is located directly above the can-support member and is attached to the upper handle, may be downwardly advanced toward the bottom of a supported can to press down on the lid and the contents inside the can.

14 Claims, 3 Drawing Sheets

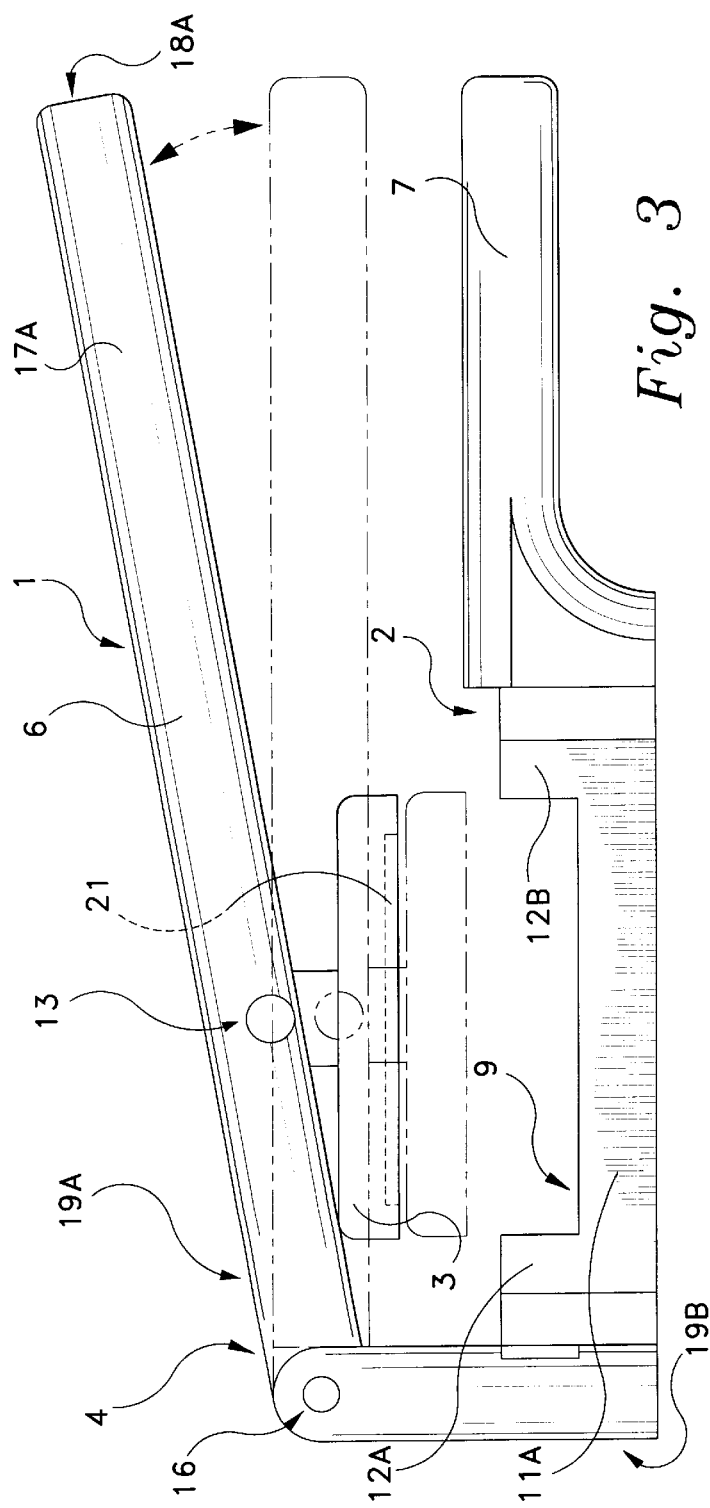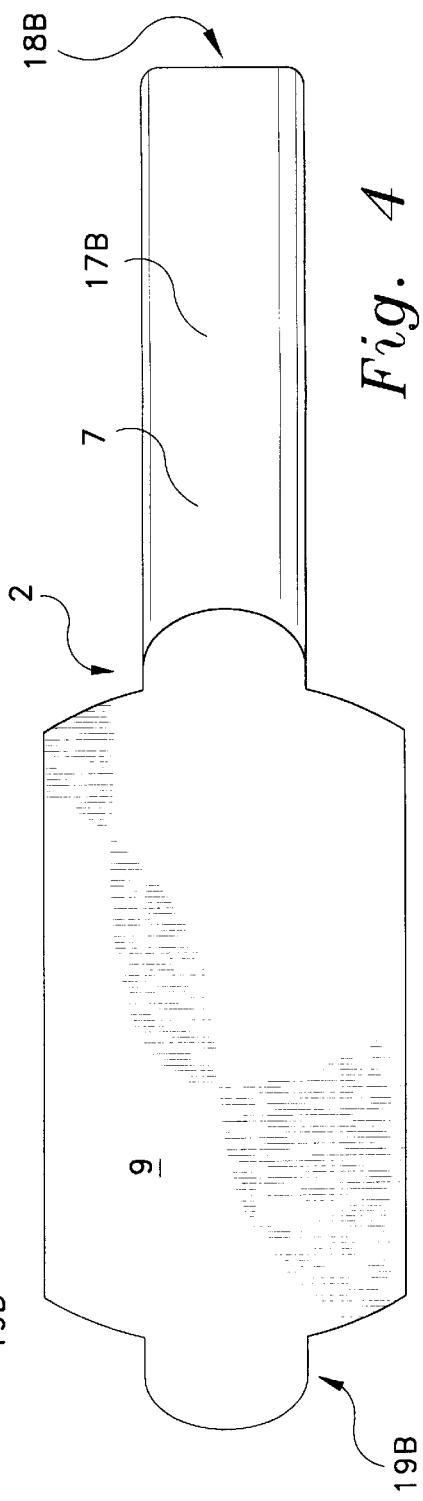

DRAINING DEVICE FOR CANNED GOODS

CROSS-REFERENCE TO RELATED APPLICATION

This application claims the benefit of U.S. Provisional Patent Application Ser. No. 60/119,991, filed Feb. 12, 1999.

BACKGROUND OF THE INVENTION

1. Field of the Invention

The present invention relates generally to a household or kitchen utensil. More specifically, the invention is a hand, press-type device adapted for draining liquids from canned goods and for removing severed lids from canned goods.

2. Description of Related Art

It is well known that many solid food products, such as fish and meat, are canned with a relatively high content of liquid, such as water or oil. Thus, it is frequently desirable or necessary to separate or extract the liquid from the solid food product in connection with preparation of the food product or to facilitate extraction of the solid food product from the can.

A number of utensils, devices, and practices have been proposed in the prior related art for use in separating the liquid from the solid contents inside a can and/or in removing a severed lid from the can.

For example, U.S. Design Pat. No. 330,313 issued on Oct. 20, 1992 to Green shows a canned food press comprising a pair of elongated handle assemblies which are pivotally connected at their distal ends. The upper handle assembly comprises an upper handle and a circular element. The lower handle assembly comprises a lower handle, a vertical member, and a circular support member. The support member has three sections of side walls that are separated by three areas with an absence of side walls. The side walls, however, are not positioned at the correct geometric positions to allow the support member to receive certain non-circular cans (such as rectangular-shaped sardine cans).

U.S. Design Pat. No. 337,702 issued on Jul. 27, 1993 to Lange shows a single piece tuna can press, having many drainage openings. In use, the single piece tuna can press may be placed on top of a can lid, or directly on top of the food product contained in the can. Pressed together with the can, the liquid is drained through the holes by inverting the can and press.

U.S. Design Pat. No. 342,649 issued on Dec. 28, 1993 to Miller et al. shows a press for canned goods comprising a pair of elongated handle assemblies which are pivotally connected at their distal ends. The upper handle assembly comprises an upper handle and a circular food pressing element having drainage holes. The lower handle assembly comprises a lower handle, a vertical member, and a bar-like or rod-like support member.

U.S. Design Pat. No. 358,304 issued on May 16, 1995 to Hoddinott shows a can squeezer comprising a pair of elongated, curved handle assemblies which are pivotally connected at about the midpoint of the assemblies. The upper handle assembly comprises a curved, upper handle at one end and a circular food pressing element at the distal end. The lower handle assembly comprises a curved lower handle at one end and a circular support member having no side walls at the distal end.

U.S. Design Pat. No. 366,189 issued on Jan. 16, 1996 to Bidlack shows a draining press for canned goods comprising a pair of elongated handle assemblies which are pivotally connected at their distal ends. The upper handle assembly comprises an upper handle and a circular food pressing element. The lower handle assembly comprises a lower handle and a circular can-support member.

U.S. Design Pat. No. 379,139 issued on May 13, 1997 to Berde shows a combined liquid extraction and lid removal tool for cans comprising a pair of elongated handle assemblies which are pivotally connected at about the midpoint of the assemblies. The upper handle assembly comprises an upper handle at one end and a circular food pressing element at the distal end. The lower handle assembly comprises a lower handle at one end and a circular support member having no side walls at the distal end.

U.S. Pat. No. 3,995,544 issued on Dec. 7, 1976 to Farley discloses a tuna squeezer and strainer utensil comprising a cup-shaped member having a cylindrical wall, a perforated base providing permeability to liquids while blocking passage of solids, and a pair of support tabs distally extending from the cylindrical wall, for grasping the press. The can and press may be inverted to permit drainage of the liquids from the container.

U.S. Pat. No. 5,272,969 issued on Dec. 28, 1993 to McDonald discloses a canned food product compressing and liquid extracting device comprising a pair of elongated lower and upper handle assemblies which are pivotally connected at their distal ends, and a linkage extending between and connected with a piston member and the one end of the lower handle to cause pivoting of the piston relative to an upper handle. The upper handle assembly comprises the upper handle, a circular food pressing element, and the piston member pivotally mounted to the upper handle for insertion into the open top end of the container so as to overlie a severed lid of the container. The lower handle assembly comprises a lower handle at one end, an upturned end portion at the other end, and a can seating means, that can take the form of a cradle or land portion, positioned between the two ends.

U.S. Pat. No. 5,363,759 issued on Nov. 15, 1994 to D'Ambrosio discloses a hand-operated can press comprising a base, a pair of parallel standards extended rigidly from the base, an inner squeezing handle spanning the ends of the pair of standards remote from the base, a pair of slide elements that may be translatable along the respective standards, an outer squeezing handle that may span the ends of the pair of slide elements remote from the base, a circular seat for receiving a cylindrical can, and a platen.

The prior art fails to teach a device or utensil regarding the draining of canned goods which enables an operator, with one hand, to compress the solid contents inside a can which has either circular or non-circular shape, to remove the unwanted liquid inside the can, and to remove the severed lid from the can, without the action being unduly unsanitary, unsafe, messy, unreliable, tiring, or time consuming. None of the above inventions and patents, taken either singly or in combination, is seen to describe the instant invention as claimed.

SUMMARY OF THE INVENTION

The present invention is a draining device adapted for draining liquids from canned goods and for removing severed lids from canned goods. Its main components include an upper handle assembly, a lower handle assembly, a food-press member, a means for attaching the food-press member to the upper handle assembly, and a means for pivotally attaching adjacent respective distal ends of the assemblies. The pivot means permits the upper handle of the upper handle assembly and the lower handle of the lower handle assembly to be moved toward and away from each other between a closed position and an opened position.

In the preferred embodiment, the upper handle assembly comprises the upper handle and the lower handle assembly comprises the lower handle and a truncated, circular can-support member. The food-press member, which is located directly above the can-support member and is attached to the upper handle assembly, may be downwardly advanced toward the bottom of a supported can to press down on the lid and the contents inside the can. To remove the liquid from the can, the device is tilted while applying sufficient pressure on the lid and the contents to expel and to direct the liquid to a sink or desired drainage receiving receptacle. To remove the severed lid of the can from the can, the upper handle, with an attached food-press member, and the lower handle are moved from the closed position toward the opened position.

Accordingly, it is a principal object of the invention to provide a draining device adapted for draining liquids from canned goods.

It is another object of the invention to provide a draining device adapted for removing severed lids from cans.

It is a further object of the invention to provide improved elements and arrangements thereof in an apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

FIG. 3 is a right side elevational view, showing an opened position in solid lines and a closed position in phantom lines, according to the present invention.

FIG. 4 is a bottom plan view thereof according to the present invention.

Similar reference characters denote corresponding features consistently throughout the attached drawings.

DETAILED DESCRIPTION OF THE PREFERRED EMBODIMENT

Figure 1:
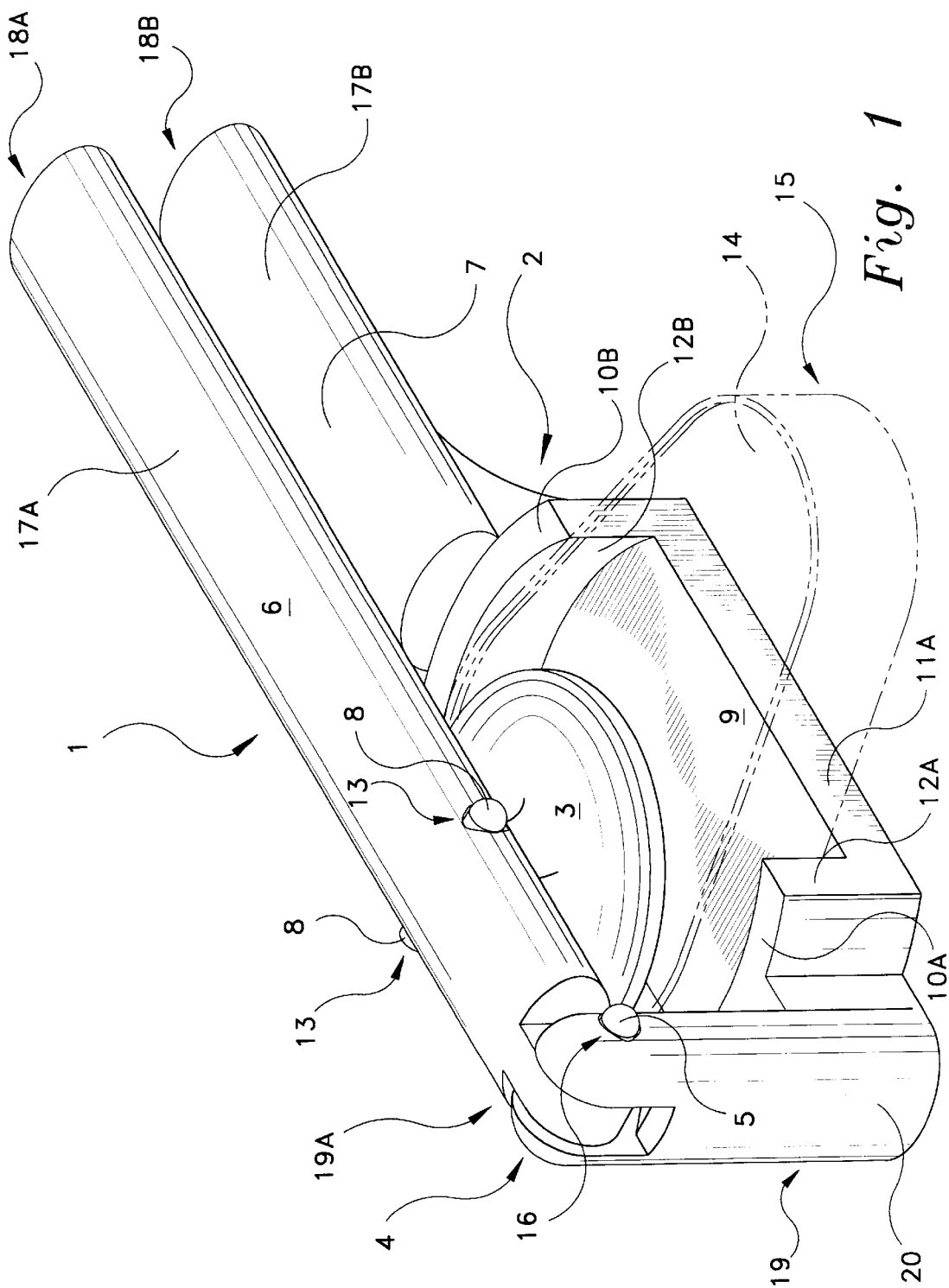
FIG. 1 is an environmental, perspective view of the draining device adapted for draining liquids from canned goods and for removing severed lids from canned goods according to the present invention.
Figure 2:
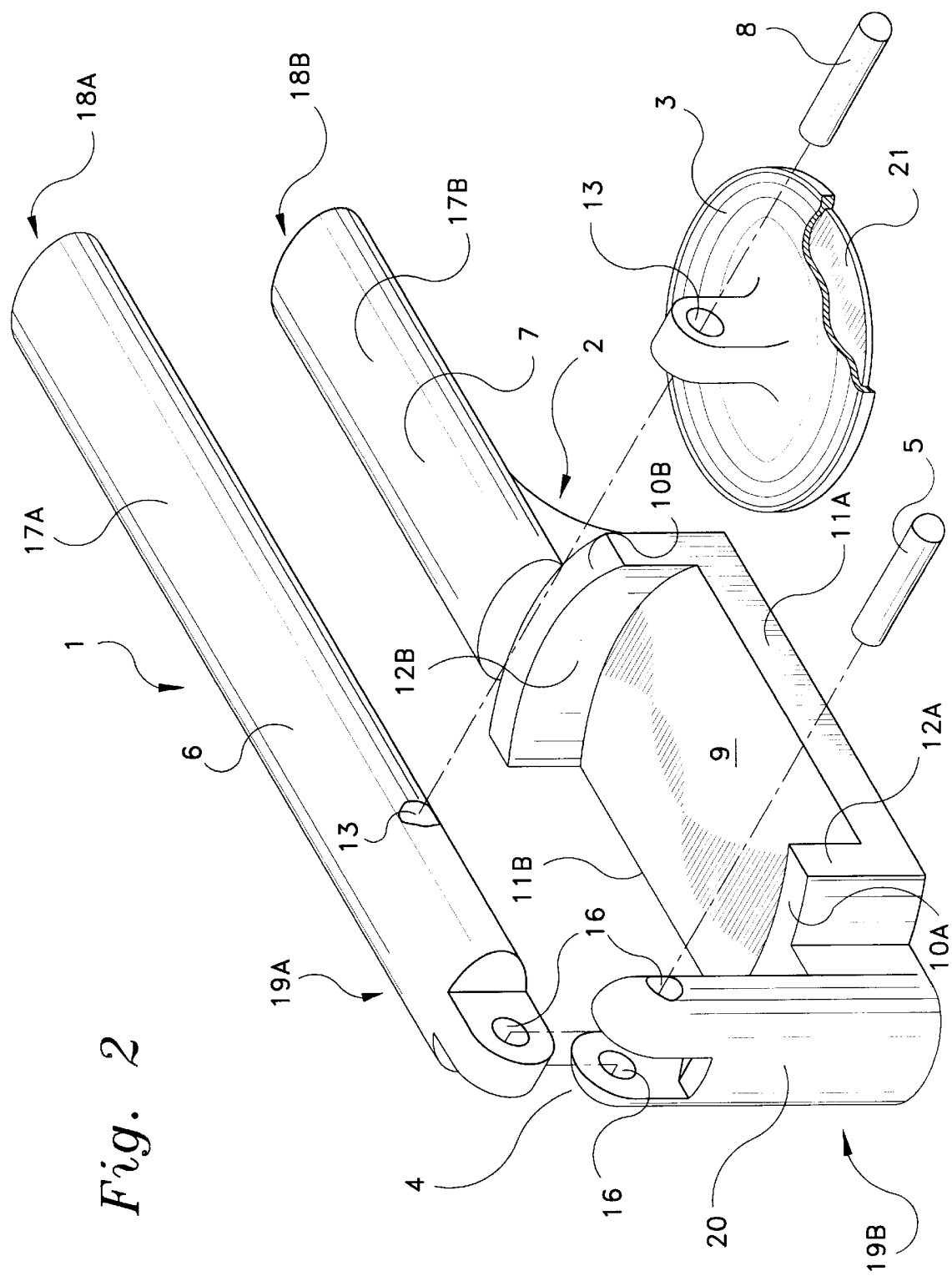
FIG. 2 is an exploded view thereof according to the present invention.

The present invention is directed to a draining device 10 adapted for draining liquids from canned goods and for removing severed lids from canned goods as diagrammatically illustrated in FIG. 1. The preferred embodiment of the invention are depicted in FIGS. 1–4. As best seen in FIGS. 1–3, the draining device 10 according to the invention includes an upper handle assembly 20, a lower handle assembly 40, a food-press member 60, an attachment pin 12 for attaching the food-press member 60 to the upper handle assembly 20, a hinge 14, and, a pivot attachment pin 16 for pivotally attaching adjacent respective distal ends of the assemblies 20, 40.

The upper handle assembly 20 (as shown in FIGS. 1–3) comprises a first end 22, a second end 24 having a pivot attachment point 25 (as shown in FIG. 2), and an elongated upper handle 26. The upper handle 26 has a first end 28, a second end 30, a hand grip portion 32 extending from the first end 28 of the upper handle 26 opposite from the second end 30 of the upper handle 26, and a flange 34 proximate the second end 30 of the upper handle 26. It is preferred that the pivot attachment point 25 of the second end 24 of the upper handle assembly 20 has an opening for the insertion of the pivot attachment pin 16 to attach the upper handle assembly 20 to the lower handle assembly 40. The flange 34 has an attachment point 36 (as shown in FIG. 2) for attaching with the food-press member 60. It is preferred that the attachment point 36 of the flange 34 has an opening for the insertion of the attachment pin 12 to attach the food-press member 60 to the flange 34.

The lower handle assembly 40 (as shown in FIGS. 1–4) comprises a first end 42, a second end 44 having a pivot attachment point 45 (as shown in FIG. 2), a lower handle 46, and a truncated can-support member 48 for seating a can 17 which has a severed top end or lid 18 and encloses a material to be compressed. It is preferred that the pivot attachment point 45 of the second end 44 of the lower handle assembly 40 has an opening for the insertion of the pivot attachment pin 16 to attach the upper handle assembly 20 to the lower handle assembly 40. The lower handle 46 has a first end 50, a second end 52, and a hand grip portion 54 extending from the first end 50 of the lower handle 46 opposite from the second end 52 of the lower handle 46. The lower handle 46 is defined at the first end 42 of the lower handle assembly 40, and is attached to the can-support member 48. The can-support member 48 has a pair of arcuate ends 55, 56 (as shown in FIGS. 1–3) and a pair of sides 57, 58 (as shown in FIGS. 1–4) that join the arcuate ends 55, 56 to transect an otherwise circular support member 48 and thus define its truncated appearance. The can-support member 48 is defined on the lower handle assembly 40 between and spaced from the first end 42 of the lower handle assembly 40 and the second end 44 thereof. The arcuate ends 55, 56 are defined at positions opposite to one another and have arcuate side walls 59, 61 that face one another. However, the sides 57, 58 have no side walls, thus permitting non-cylindrical cans 17 to be received by the can-support member 48.

The food-press member 60 (as shown in FIGS. 1–3) has an attachment point 62 (as shown in FIG. 2) for attaching with the upper handle 26. It is preferred that the attachment point 62 of the food-press member 60 has an opening for the insertion of the attachment pin 12 to attach the food-press member 60 to the flange 34. The food-press member 60 faces toward and substantially centered with the can-support member 48 on the lower handle assembly 40 for applying force on and driving the lid 18 of the can 17 toward the bottom 19 of the can 17 as the handles 26, 46 are moved relative to one another from an opened position 64 (as shown in FIG. 3) toward a closed position 66 (as best shown in FIG. 4). When applying a sufficient force as the handles 26, 46 are moved relative to one another from the opened position 64 toward the closed position 66, the food-press member 60 is forced down on the lid 18 to compress the material in the can 17 and extract liquid therefrom. The food-press member 60 also can be used to then remove the severed lid 18 from the can 17 as the handles 26, 46 are moved relative to one another from the closed position 66 toward the opened position 64 by means of magnetic attraction. Thus it is additionally preferred that the food-press member 60 includes a magnetic member 68 to attach itself to the lid 18 of the can 17 that is positioned on the can-support member 48.

It is preferred that the arcuate ends 55, 56 of the can-support member 48 and that the lower handle 46 are coaxially arranged. In this arrangement, the food-press member 60 can be attached to the flange 34 at the attachment points 36, 62 of the flange 34 and of the food-press member 60. In addition, the food press member 60 will be positioned to overlie the lid 18 of the can 17 when the can 17 is received by the can-support member 48.

To provide a convenient point about which the handles 26, 46 pivot, it is additionally preferred that the lower handle assembly 40 further comprises a vertical end portion 70 (as shown in FIGS. 1–4) extending in transverse relation to the remainder of the lower handle assembly 40. The second end 44 of the lower handle assembly 40 is located on the vertical end portion 70 thereof.

The pivot permits the upper handle 26 of the upper handle assembly 20 and the lower handle 46 of the lower handle assembly 40 to be moved toward and away from each other between the closed position 66 and the opened position 64.

To lend leverage for squeezing the can 17, the can-support member 48 should thus be disposed between the vertical end portion 70 at the second end 44 of the lower handle assembly 40 and the lower handle 46 at the first end 42 thereof.

Certain advantages can be obtained by manufacturing the assemblies 20, 40 individually as one-piece members. It is further preferred that the assemblies 20, 40, food-press member 60 (except for the magnetic member 68 of the food-press member 60) and the hinge 14 be manufactured of hard nylon or of a similar material. The attachment pin 12 and the pivot attachment pin 16 may be manufactured of stainless steel or of a similar material for structural rigidity, durability, and strength.

It is to be understood that the present invention is rot limited to the sole embodiment described above, but encompasses any and all embodiments within the scope of the following claims.

I claim:

1. A draining device adapted for draining liquids from canned goods and for removing severed lids from canned goods comprising:

an upper handle assembly comprising a first end, a second end, and an upper handle,
    said upper handle having a first end and a second end;
a lower handle assembly comprising a first end, a second end, a lower handle, and a truncated-circular can-support member for seating a can which has a severed top end or lid and encloses a material to be compressed,
said lower handle having a first end and a second end, is defined at said first end of said lower handle assembly, and is attached to said can-support member,
said can-support member having a pair of arcuate ends and a pair of sides, and is defined on said lower handle assembly between and spaced from said first end of said lower handle assembly and said second end thereof,
wherein said arcuate ends having side walls which face toward one another, and is defined at positions opposite to one another,
wherein said sides having no side walls;
a food-press member for attaching to the lid of the can so as to overlie the lid for applying a sufficient force on the lid as said handles are moved relative to one another from an opened position toward a closed position to compress the material in the can and extract liquid therefrom and then remove the lid from the can as said handles are moved relative to one another from said closed position toward said opened position;
means for attaching said food-press member to said upper handle assembly; and
means for pivotally attaching adjacent respective said second ends of said assemblies to permit said handles to be moved relative to one another toward and away from each other between said closed position and said opened position.

2. The device according to claim 1 wherein:
said upper handle is elongated.

3. The device according to claim 1 wherein:
said upper handle further having a flange proximate said first end of said upper handle wherein said flange having an attachment point for attaching said food press member.

4. The device according to claim 3 wherein:
said lower handle assembly further comprising a vertical end portion extending in transverse relation to the remainder of said lower handle assembly wherein said vertical end portion is defined at said second end of said lower handle assembly.

5. The device according to claim 4 wherein:
each of said second ends of said assemblies having a pivot attachment point for attaching to one another;
said means for pivotally attaching adjacent respective said second ends of said assemblies to permit said handles to be moved relative to one another toward and away from each other between a closed position and an opened position is a hinge,
    wherein said hinge attaching said second ends of said assemblies at pivot attachment point of said second ends with a pivot attachment pin;
each of said flange of said upper handle and said food-press member having an attachment point for attaching to one another; and
said means for attaching said food-press member to said upper handle is with an attachment pin.

6. The device according to claim 5 wherein:
said pins are made of stainless steel.

7. The device according to claim 1 wherein:
each of said handles having a hand grip portion extending from said first end of each said handle opposite from said second end of each said handle.

8. The device according to claim 1 wherein:
said lower handle assembly further comprising a vertical end portion extending in transverse relation to the remainder of said lower handle assembly wherein said vertical end portion is defined at said second end of said lower handle assembly.

9. The device according to claim 8 wherein:
each of said second ends of said assemblies having a pivot attachment point for attaching to one another;
said means for pivotally attaching adjacent respective said second ends of said assemblies to permit said handles to be moved relative to one another toward and away from each other between a closed position and an opened position is a hinge,
    wherein said hinge attaching said second ends of said assemblies at pivot attachment point of said second ends with a pivot attachment pin;
each of said upper handle and said food-press member having an attachment point for attaching to one another; and
said means for attaching said food-press member to said upper handle is with an attachment pin.

10. The device according to claim 9 wherein:
said pins are made of stainless steel.

11. The device according to claim 1 wherein:
said arcuate ends of said can-support member and said lower handle are coaxially arranged.

12. The device according to claim 1 wherein:
said food-press member is facing toward and substantially centered with said can-support member on said lower handle assembly for applying force on and driving the lid of the can downward and toward bottom of the can as said handles are moved relative to one another from said opened position toward said closed position.

13. The device according to claim 1 wherein:
said food-press member having a magnetic member.

14. The device according to claim 1 wherein:
said food-press member is circular.

* * * * *